United States Patent
Hepler et al.

(10) Patent No.: US 10,333,298 B2
(45) Date of Patent: Jun. 25, 2019

(54) METHOD AND SYSTEM FOR BIO-MECHANICAL POWER MANAGEMENT

(71) Applicant: Bionic Power Inc., Vancouver (CA)

(72) Inventors: Daniel Loren Hepler, Vancouver (CA); Clive Edward Mullins, North Vancouver (CA); Mare Badenhorst, Port Coquitlam (CA)

(73) Assignee: Bionic Power Inc., Vancouver (CA)

( * ) Notice: Subject to any disclaimer, the term of this patent is extended or adjusted under 35 U.S.C. 154(b) by 562 days.

(21) Appl. No.: 15/048,015

(22) Filed: Feb. 19, 2016

(65) Prior Publication Data

US 2017/0244247 A1 Aug. 24, 2017

(51) Int. Cl.
| | | |
|---|---|---|
| H02J 3/06 | (2006.01) | |
| H02J 1/10 | (2006.01) | |
| H02J 3/14 | (2006.01) | |
| H02J 1/14 | (2006.01) | |
| H02J 7/00 | (2006.01) | |
| H02J 7/32 | (2006.01) | |
| H02J 7/34 | (2006.01) | |

(52) U.S. Cl.
CPC .............. *H02J 1/14* (2013.01); *H02J 7/0068* (2013.01); *H02J 7/32* (2013.01); *H02J 7/345* (2013.01)

(58) Field of Classification Search
CPC ....................................................... H02J 1/14
See application file for complete search history.

(56) References Cited

U.S. PATENT DOCUMENTS

| | | | |
|---|---|---|---|
| 5,712,548 A * | 1/1998 | Tice ..................... | H02P 29/0241 318/293 |
| 6,328,325 B1 * | 12/2001 | Greenwood ............. | B62M 1/16 280/222 |
| 7,361,999 B2 | 4/2008 | Yeh | |
| 7,652,386 B2 * | 1/2010 | Donelan ................... | F03G 5/00 290/1 R |
| 8,736,087 B2 | 5/2014 | Mullins et al. | |
| 9,057,361 B2 | 6/2015 | Donelan et al. | |
| 9,222,468 B2 | 12/2015 | Mullins et al. | |
| 9,604,534 B1 * | 3/2017 | Zhou ..................... | B60K 11/085 |

(Continued)

OTHER PUBLICATIONS

Patent Cooperation Treaty International Search Report dated Apr. 27, 2017 issued for the copending application assigned International Application No. PCT/CA2017/050190 with an International Filing Date of Feb. 15, 2017.

(Continued)

*Primary Examiner* — Alfonso Perez Borroto
*Assistant Examiner* — Esayas G Yeshaw
(74) *Attorney, Agent, or Firm* — Damien G. Loveland

(57) ABSTRACT

Electrical energy produced by an energy harvester is stored on a temporary basis in an interim energy storage module before transferring it to a load. The current fed to the load is controlled so that a voltage limit of, for example, a capacitor in the interim storage module is not reached. By at least partially synchronizing the current consumed with the power produced, the capacity of the interim energy storage can be minimized, while still beneficially reducing fluctuations in the current. Current consumed may be determined by the use of a voltage to current look-up table, so that minimal communication overhead between the load and the power source is needed.

23 Claims, 5 Drawing Sheets

(56) References Cited

U.S. PATENT DOCUMENTS

| | | | |
|---|---|---|---|
| 2009/0281412 A1* | 11/2009 | Boyden | A61B 5/0059 |
| | | | 600/407 |
| 2013/0056981 A1* | 3/2013 | Mullins | F03G 5/06 |
| | | | 290/7 |
| 2014/0001764 A1* | 1/2014 | Greenwood | H02K 7/1861 |
| | | | 290/1 C |
| 2014/0152008 A1 | 6/2014 | Donelan et al. | |
| 2015/0001853 A1 | 1/2015 | Shepertycky et al. | |
| 2015/0333553 A1* | 11/2015 | Huang | H02J 7/0055 |
| | | | 320/138 |

OTHER PUBLICATIONS

Patent Cooperation Treaty Written Opinion of the International Searching Authority dated Apr. 27, 2017 issued for the copending application assigned International Application No. PCT/CA2017/050190 with an International Filing Date of Feb. 15, 2017.

* cited by examiner

METHOD AND SYSTEM FOR BIO-MECHANICAL POWER MANAGEMENT

TECHNICAL FIELD

This application relates to a method and system for the management of power produced by a bio-mechanical energy harvester. More specifically, this application relates to the interim storage of electrical energy produced by the harvester and the management of its transfer to a load without reaching the voltage limit of the interim storage.

BACKGROUND

Energy may be harvested from the movement of body joints of humans and other animals by converting mechanical energy derived from such movement to electrical energy. Activities where body joints move repeatedly, such as walking, jogging, and running, for example, present opportunities to harvest energy from moving body joints over an extended period of time. In some energy harvesting devices and methods, a generator driven by joint motion is coupled to an electrical load. Since the instantaneous mechanical power provided by body joints during repetitive or cyclical activities varies markedly over the period of each cycle, the harvested electrical power produced also varies markedly over each cycle. For example, the power produced by an energy harvester may on average be 10 W, but it may vary from zero to 60 W multiple times per stride. During a rapid gait, or a change of gait, and where a person is using two energy harvesters, one on each leg, the combined instantaneous output power may reach 120 W.

Intermediate storage capacitors may be used to store the energy produced by energy harvesters, but if these capacitors become fully charged or reach a predetermined voltage limit, then they can no longer accept any more energy. This results in the harvester ceasing to create energy, which in turn causes a sudden drop in the generator torque felt by the user's body joints (e.g. knees), and this causes discomfort to the user.

This background information is provided to reveal information believed by the applicant to be of possible relevance to the present invention. No admission is necessarily intended, nor should be construed, that any of the preceding information constitutes prior art against the present invention.

SUMMARY OF INVENTION

The present invention is directed to a method and system for the intermediate storage of electrical energy produced by a bio-mechanical energy harvester and the management of its transfer to a load without reaching the voltage limit of the interim storage. The current consumed by the load is, to an extent, synchronized with the power production of the energy harvester so that the capacity of the interim energy storage can be minimized, while, however, using the interim energy storage to reduce fluctuations in the current supplied to the load. The power management device of the present invention also minimizes communication overhead between the load and the power source, allowing for sufficiently rapid synchronization updates. It also increases safety of the user by minimizing the capacity of the interim energy storage, which is carried or worn in close proximity to the user's body. Capacitors, which may be used for the interim energy storage, may be more risky than batteries because they have a higher power density, and thus can release that energy more quickly and destructively.

Disclosed herein is a system for managing power supplied to a load from a bio-mechanical energy harvester, comprising: an energy harvester configured to attach to at least two body segments and to generate electrical energy as a result of relative movement between said segments; an interim electrical storage module that has a voltage limit and stores said energy; and a control module that reads a voltage of said storage module, determines a current to supply to the load based on said voltage, and controls supply of the determined current to the load from said storage module, thereby maintaining the voltage of said storage module below the voltage limit.

Also disclosed herein is a method for managing power supplied to a load from a bio-mechanical energy harvester, comprising: mechanically linking an energy harvester to at least two body segments so that electrical energy is generated as a result of relative movement between said segments; storing said generated energy in an interim electrical storage module that has a voltage limit; and repeatedly reading a voltage of said storage module, determining a current to supply to the load based on said voltage, and controlling supply of the determined current to the load from said storage module for a predetermined duration of time, thereby maintaining the voltage of said storage module below the voltage limit.

BRIEF DESCRIPTION OF DRAWINGS

The following drawings illustrate embodiments of the invention, which should not be construed as restricting the scope of the invention in any way.

DESCRIPTION

A. Glossary

The term "firmware" includes, but is not limited to, program code and data used to control and manage the consumption of power the load of the system.

The term "energy harvester" includes any device that converts bio-mechanical motion, such as movement of one or more limbs, to electrical energy, and may include devices in the format of a knee-brace or exo-skeleton, for example. An energy harvester may also be powered, in that it returns kinetic energy to the user of the harvester, for example to assist in walking or to assist in portions of the user's gait.

The term "hardware" includes, but is not limited to, the physical housing for a computer or device as well as its display if any, connectors, wiring, circuit boards having processor and memory units, power supply, and other electrical or electronic components.

The term "interim electrical storage" includes, but is not limited to, a module comprising one or more capacitors, super-capacitors and/or batteries that is used for storing electrical energy on an interim basis. It may include one or more inductors for storing electrical energy.

The term "module" can refer to any component in this invention and to any or all of the features of the invention without limitation. A module may be a software, firmware, hardware or mechanical module.

The term "processor" is used to refer to any electronic circuit or group of circuits that perform calculations, and may include, for example, single or multicore processors, multiple processors, an ASIC (Application Specific Integrated Circuit), and dedicated circuits implemented, for example, on a reconfigurable device such as an FPGA (Field Programmable Gate Array). The processor performs one or more of the steps in the control scheme, whether they are explicitly described as being executed by the processor or whether the execution thereby is implicit due to the steps being described as performed by code or a module. The processor, if comprised of multiple processors, may be located together or separately from each other.

The term "software" includes, but is not limited to, program code that is executed to perform the computations necessary for reading voltages, accessing a look-up table, retrieving current commands, calculating current commands, adapting a look-up table and/or other functions.

The term "system" when used herein without qualification refers to a system for managing the energy supplied from a bio-mechanical energy harvester to a load, without exceeding a voltage limit of an interim storage module, the system being the subject of the present invention. The system may embody further features, such as calculating the current to be supplied to the load based at least partly on prior values of current drawn.

The term "user" refers to a person or animal that is wearing a bio-mechanical energy harvester.

B. Exemplary Embodiment

Figure 1:
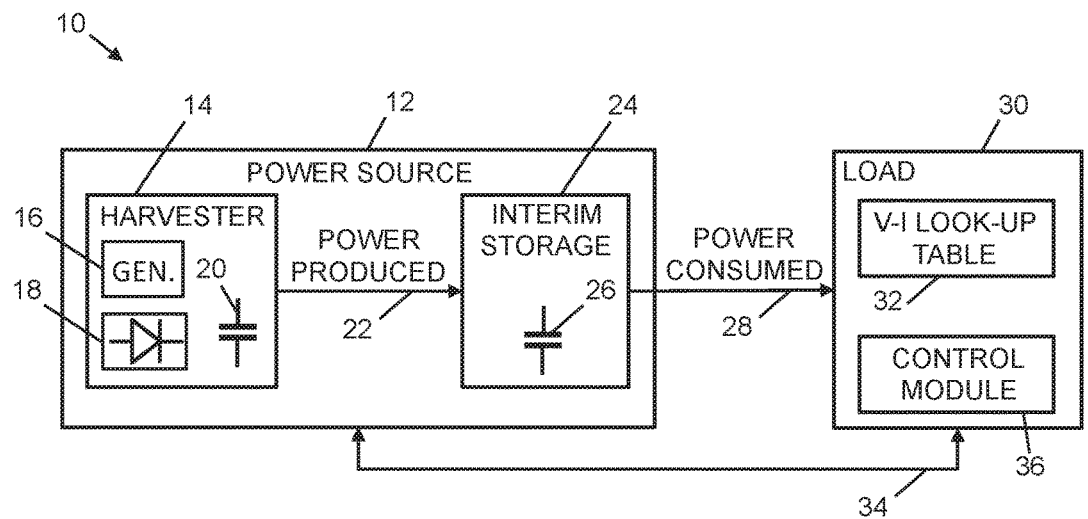
FIG. 1 shows a simplified schematic block diagram of a system for storing electrical energy on an interim basis and controlling the rate at which it is consumed, in accordance with an embodiment of the present invention.

Referring to FIG. 1, there is shown a system 10 for managing power supplied to a load from a bio-mechanical energy harvester. The power management system 10 includes a power source 12, which may be attached to two or more human or animal body segments in order to convert mechanical power generated by the segments into electrical power. The power source 12 includes one or more bio-mechanical kinetic energy harvesters 14. For example, there may be two energy harvesters 14, each one being connected to a thigh and a shin, across a user's knee joint. Such an energy harvester 14 may include an electrical generator 16, a rectifier 18 and a smoothing capacitor 20. The electrical generator 16 may generate AC (alternating current), which is rectified into DC (direct current) by the rectifier 18, and then smoothed by the smoothing capacitor 20. The smoothing capacitor 20 significantly reduces the variation in the magnitude of the DC, which, for the simplest generator, would otherwise vary from zero to peak twice for every revolution of the generator 16. The result of using a smoothing capacitor 20 is DC with some ripple. However, while the variations in current due to rotation within a single cycle of the generator are significantly reduced by the rectifier 18, the average magnitude of the current still varies widely when considered over multiple generator cycles. This is due to the widely varying amount of power generated by the harvester during a cycle of gait of the user, which encompasses multiple generator cycles.

The power produced 22 by the harvester(s) 14 is fed to an interim electrical storage module 24, which includes one or more interim storage capacitors 26. As a non-limiting example only, the capacity of the interim storage capacitor may be about 40 mF. The function of the interim storage capacitor is to assist with the levelling out of the power that is consumed 28 by the load 30. The features of the power source 12 may be, for example, incorporated in an APS-PowerWalk™ device, manufactured by Bionic Power Inc.

The power consumed 28 by the load 30 is specified by a voltage to current look-up table 32 in the load, accessible by the load, or accessible by a control algorithm that controls the power consumed by the load. The load 30 may be a power manager, which may itself have other loads. The look-up table may be used to keep the voltage on the interim storage capacitor 26 within a well-defined, predetermined range. Communication between the load 30 and the power source 12 occurs via link 34, which may, for example, be an SMBus (System Management Bus) communication link. Use of a look-up table simplifies the SMBus requirements as it only requires a low communication overhead. A control module 36 accesses the voltage to current look-up table 32 and the voltage on the interim storage capacitor 26 to determine how much current should be drawn by the load 30. The current that is drawn may be determined at least in part by a control algorithm. The control module may include a processor and memory, and may be formed by one or more of software, firmware and hardware.

In order to minimize the energy storage capacity of the interim electrical storage module 24, the power consumption 28 of the load 30 needs to be synchronized with the power produced 22 by the power source 12. In general, the better the synchronization, the smaller the interim storage capacity requirement, at the expense of a higher variation in the power source's output current or voltage or both.

Figure 2:
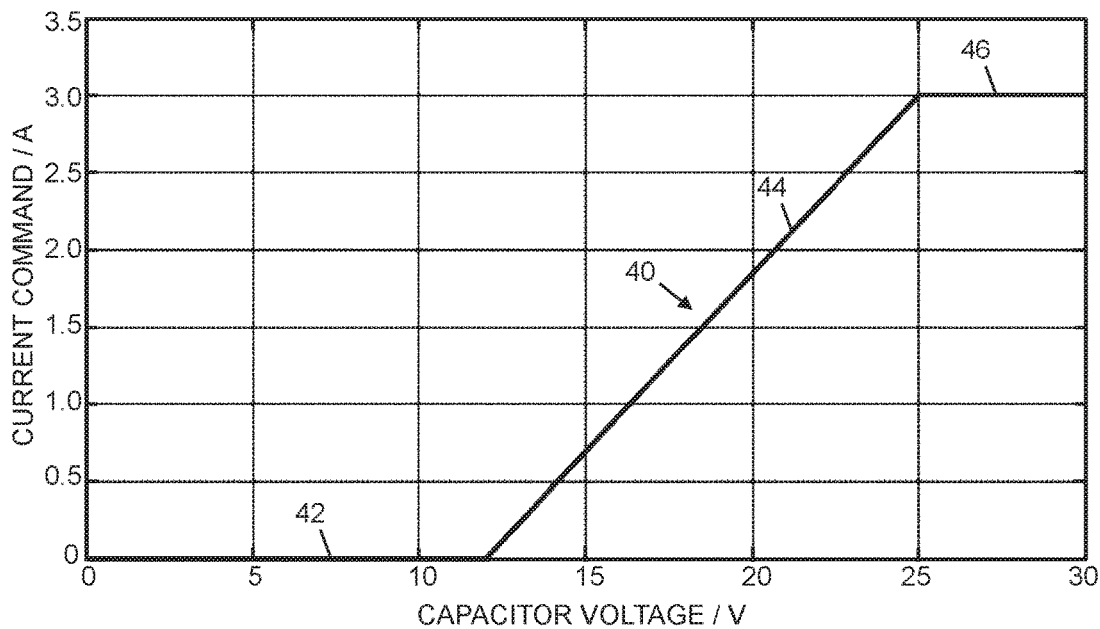
FIG. 2 is a graphical representation of a look-up table for determining the amount of current to be commanded by the load as a function of the capacitor voltage of the interim energy storage module, in accordance with an embodiment of the present invention.

Referring to FIG. 2, an example of a voltage to current look-up table 32 is shown graphically. Plot 40 indicates the amount of current commanded by the load 30 as a function of voltage of the interim storage capacitor 26. At low interim storage capacitor voltages, in this example below a threshold of 12V, the current command is zero, as shown by segment 42 of the plot 40. The control module will only permit current to be supplied to the load if the voltage of the interim storage capacitor exceeds the threshold. Between voltages of 12V and 25V, the current command increases linearly to a maximum of 3 A, as shown by segment 44 of the plot 40. For voltages above 25V, the current command remains a level 3A, as indicated by segment 46 of the plot 40.

Figure 3:
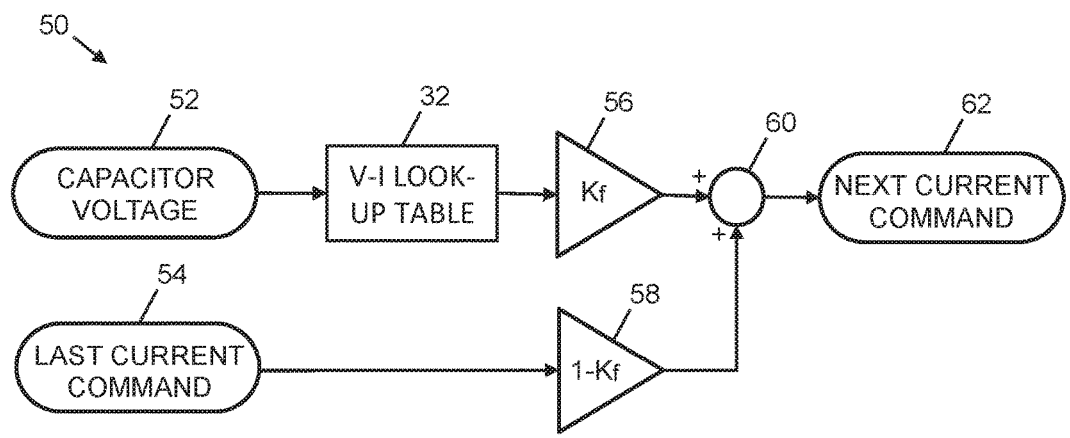
FIG. 3 is a block diagram of a current command control scheme, in accordance with an embodiment of the present invention.

Referring to FIG. 3, detail of the control scheme 50, which may at least in part be embodied in the control module 36, is shown. The control scheme is such that it can control the current based on both the energy stored in the interim storage capacitor and previous levels of current drawn. The control module 36 reads the voltage 52 of the interim storage capacitor 26 and then accesses the voltage to current look-up table 32 to determine a corresponding value of current $I_V$. The value $I_V$ is an unfiltered current value based entirely on the voltage 52 of the interim storage capacitor 26. The obtained current value $I_V$ is then passed through a digital filter 56. Digital filter 56 is controlled by the value of a factor $K_f$, which multiplies the input value $I_V$ by a number $K_f$ in the range $0 < K_f \leq 1$, thereby effectively resulting in the output $K_f I_V$ being a fraction of the input. The control module 36 also accesses the last value $I_L$ of current commanded 54 and passes this through a different digital filter 58. Digital filter 58 is controlled by the value of factor $(1-K_f)$, which multiplies the input value $I_L$ by a number $(1-K_f)$ in the range $0 \leq (1-K_f) < 1$, also resulting in the output $(1-K_f)I_V$ being a fraction of the input. Both fractions $(K_f, 1-K_f)$ add up to one. The outputs of the digital filters are summed by adder 60. The effect of the adder 60 and the filters 56, 58 is to weight the voltage and last command inputs in the ratio $K_f:(1-K_f)$ respectively. The output from the adder 60 is the value of the current to be commanded in the next current command 62.

The whole process is repeated regularly so that the current command is always up to date. The current command update rate can be set by a parameter $T_c$, which is a representation of the time between successive current commands. After a current command is applied, the current remains at the set level for the predetermined amount of time $T_c$. Parameter $T_c$ may be set to 100 ms, for example. The smaller the value of $T_c$, the better the synchronization between the power produced 22 and the power consumed 28. Also, the smaller the value of $T_c$, the smaller the required capacity of the interim storage capacitor 26, at the expense of a higher variation in output current or voltage or both.

The digital filter factor $K_f$ can be used to smooth out the current command from one update to the next. At one extreme, if $K_f=1$, then the next current command 62 will be determined only by the voltage 52 on the interim storage capacitor 26, and not on any previous values 54 of current commanded. In the other extreme, which would not be practical to use, the next current command would always be determined by the previous commands 54, and not by the voltage 52 on the interim storage capacitor 26. If $K_f=0.5$, then the next current command will be an average of the new value as determined by the look-up table 32 and the last value 54 of the current command. If $K_f=0.25$, the next current command is 25% of the current as determined solely by the look-up table 32 plus 75% of the last current command 54. The filters 56, 58 form an infinite impulse response (IIR) filter, since the last current command will actually be based in part on the command before it, and so on back, in theory ad infinitum.

The digital filters 56, 58 and the factor $K_f$ can be used to low-pass filter the output current. The magnitude of the changes in current can be increased by increasing $K_f$ towards a value of 1, and they can be decreased by reducing the value of $K_f$ towards 0. If $K_f$ is dialed close to 1, the current will vary quickly, and will have a higher RMS (root mean square) component. If $K_f$ is dialed close to 0, the current will vary slowly and have a lower RMS component. The variation in voltage of the interim storage capacitor will have the opposite change to the change in the current. However, dialing $K_f$ closer to 0 will have the risk that voltage limit of the interim storage capacitor is hit, causing the output current to cycle harshly on and off as this limit is hit. There is therefore a trade-off that depends on the power being generated and the size of the intermediate storage. At any moment, the power drawn by the load must be high enough to prevent the interim storage capacitor 26 from filling up.

The filters 56, 58 are optional, but are included in some embodiments to avoid the control module 36 having to unnecessarily turn power to the load off and on during regular operation.

Figure 4:
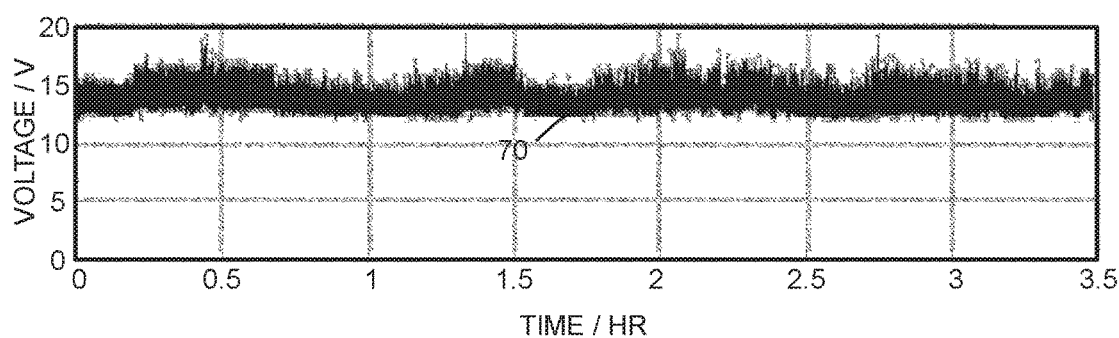
FIG. 4 is a graph of interim storage capacitor voltage as a function of time during a 3.5 hour hike, obtained from an example embodiment of the present invention.
Figure 5:
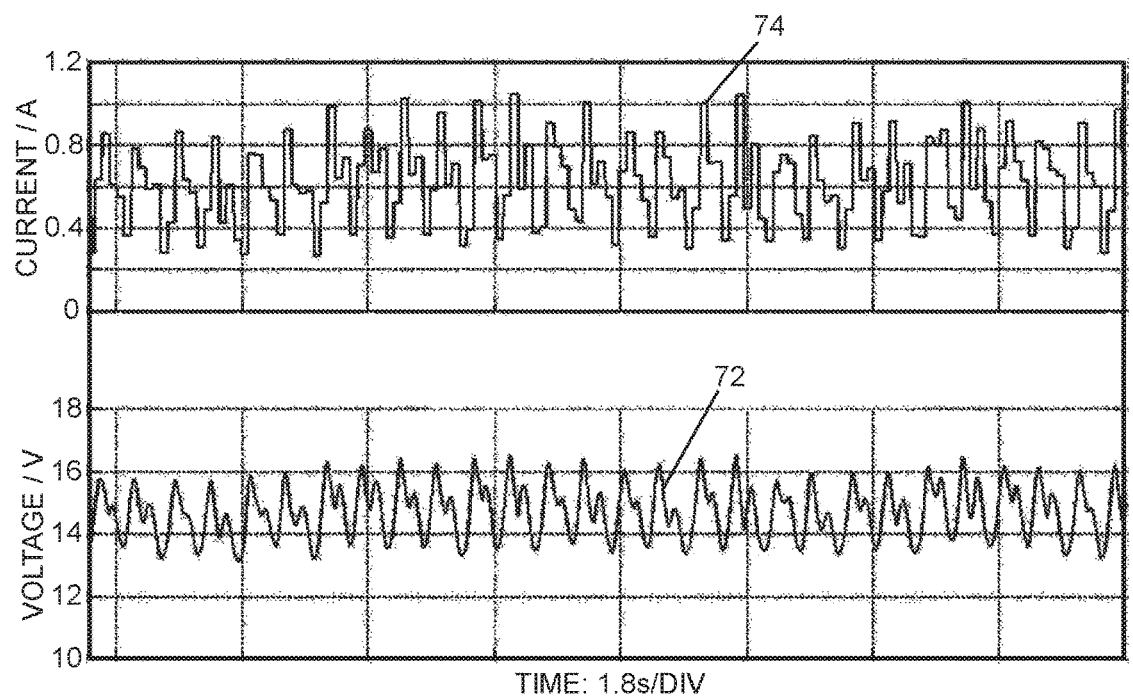
FIG. 5 is a graph of current discharged from the interim storage and the capacitor voltage of the interim storage, both as a function of time, where filter factor $K_f=1$.

Referring to FIG. 4, the variation of interim storage capacitor voltage is shown for a 3.5 hour hike over variable terrain, where $K_f=1$ and $T_c=0.1$ s and the value of the interim storage capacitor is 40 mF. As can be seen, the voltage 70 stays within about a 5V range for almost all of the hike. A close-up view of a section of the plot in FIG. 4 can be seen in the lower portion of FIG. 5. The variation in voltage over about a 15 s time interval is shown in the lower plot 72 of FIG. 5, in which one time division equals 1.8 seconds. It can be seen that the voltage varies between about 13V and 16V. The variation of the current command is shown on the same time scale in the upper plot 74 of FIG. 5. Here, it can be seen that the current command varies between about 0.3 A and 1.0 A, with changes in the value of the current apparent in a step-wise fashion at 0.1 s time intervals.

Figure 6:
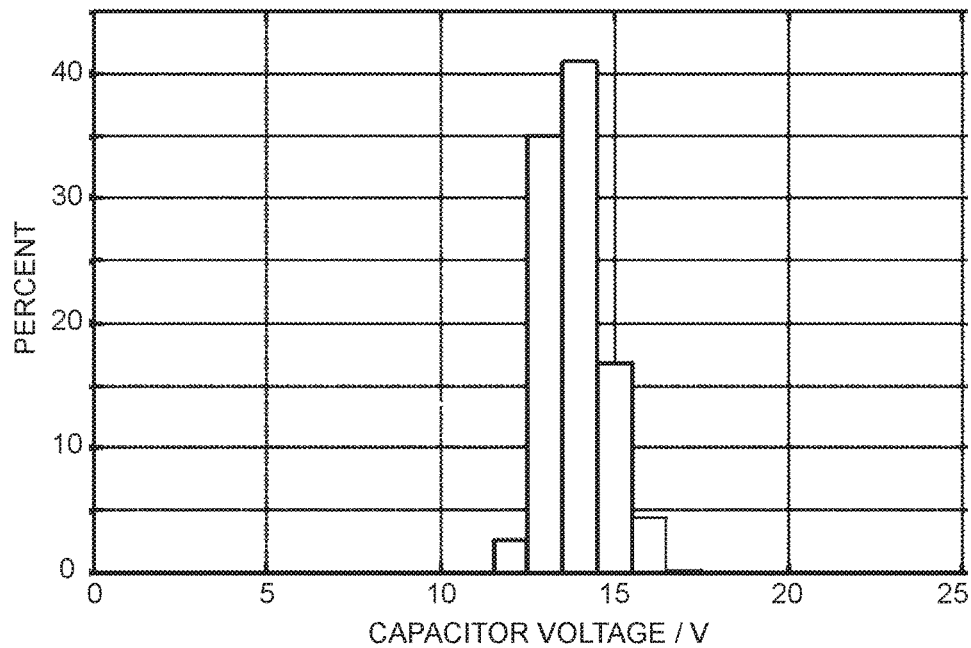
FIG. 6 is a histogram of the capacitor voltages of the graph of FIG. 5.

FIG. 6 shows a histogram of the voltages of the interim storage capacitor for the entire 3.5 hour hike of FIG. 4. Almost all of the voltages lie in the range 12-16V.

Figure 7:
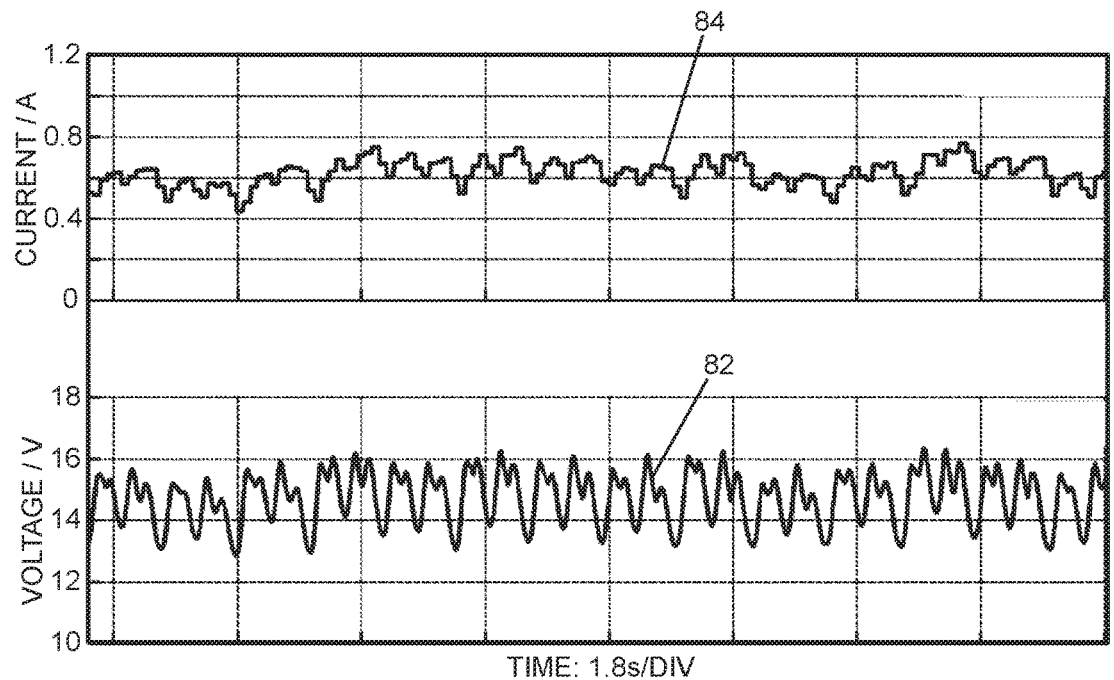
FIG. 7 is a graph of current discharged from the interim storage and the capacitor voltage of the interim storage, both as a function of time, where filter factor $K_f=0.25$.
Figure 8:
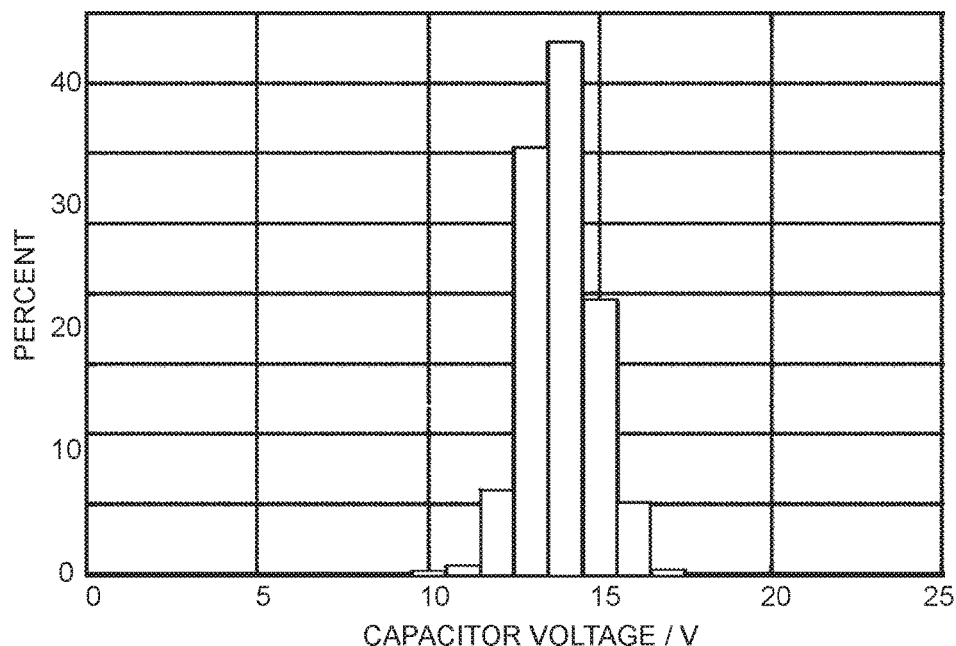
FIG. 8 is a histogram of the capacitor voltages of the graph of FIG. 7.

Referring to FIG. 7, the variation of voltage of the interim storage capacitors is shown in the lower plot 82 over about a 15 s time interval, for $K_f=0.25$ and $T_c=0.1$ s and an interim storage capacity of 40 mF and for a portion of the same 3.5 hour hike. In the upper plot 84, the variation in current command over the same time period is shown. When comparing the upper plot 84 with the upper plot 74 of FIG. 5, it can be seen that the effect of reducing $K_f$ from 1 to 0.25 is to smooth the current drawn. The resulting current can be seen to stay within a range of about 0.4-0.8 A, which is about half of the previous range. Also, there are smaller changes in current from step to step. The resulting steadier current, i.e. with a lower RMS component, is more appropriate and efficient for some types of load, such as for rechargeable battery charging. The lower plot 82 of FIG. 7 shows a slightly wider variation in voltage than the lower plot 72 of FIG. 5. Although it is difficult to see, it becomes apparent when looking at the histogram of FIG. 8, which shows the voltages over the entire same 3.5 hour hike. In particular, the histogram of FIG. 8 has a wider spread of voltages than the histogram of FIG. 6. This shows that while the current command has been significantly smoothed, the corresponding increase in the variability (or RMS component) of the voltage is minor.

One of the main benefits of the system 10 and associated control method is that the energy transmission efficiency between power source 12 and load 30 is improved. Steadier currents with lower RMS components result in improved transmission efficiency, so minimizing current and RMS current is important to maintain high efficiency.

D. Variations

Figure 9:
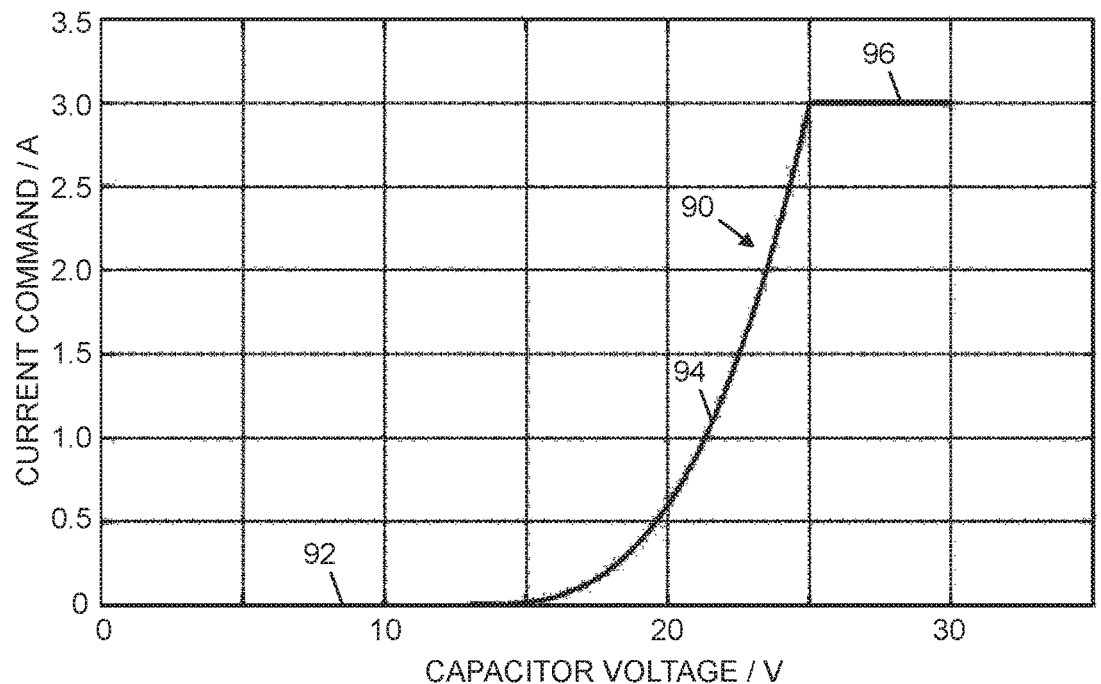
FIG. 9 is a graphical representation of an alternate look-up table for determining the amount of current to be commanded by the load as a function of the capacitor voltage of the interim energy storage, in accordance with an embodiment of the present invention.

Referring to FIG. 9, a graphical representation of an alternate look-up table is shown. This has been used in cases where $T_c=0.10$ s, $K_f=0.25$ and the interim storage capacitor is 30 mF. In this plot 90, the current command has an initial segment 92 where the current drawn is zero, a middle section 94 where the current increases with voltage non-linearly (e.g. quadratically, polynomially, exponentially), and an end section 96 where the current command is constant. The curved portion 94 of the plot 90 starts with a shallow gradient and becomes increasingly steep as the voltage increases.

Figure 10:
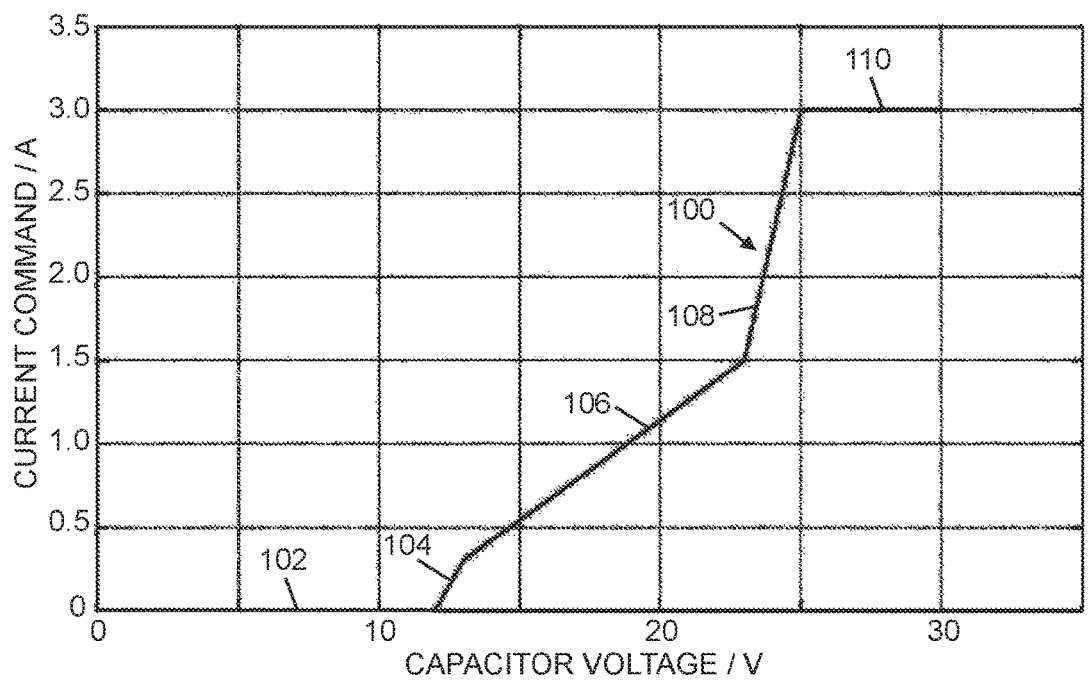
FIG. 10 is a graphical representation of a further alternate look-up table for determining the amount of current to be commanded by the load as a function of the capacitor voltage of the interim energy storage, in accordance with an embodiment of the present invention.

Referring to FIG. 10, a further example of a look-up table is shown. Again, this has been used with $T_c=0.10$ s, $K_f=0.25$ and an interim storage capacitor of 30 mF. Here, the plot 100 has an initial flat section 102 where the current command is zero, a second section 104 where the current command increases linearly with voltage, a third section 106 where the current command increases linearly with voltage at a different gradient, a fourth section 108 where the current command increases linearly with voltage at yet another gradient, and a final section 110 where the current command is constant.

Depending on the embodiment, the value of the current command obtained from the look-up table may be the value that is closest to the value that corresponds to the inputted capacitor voltage. In other embodiments, the obtained current command may be a value that is interpolated from the two values that are closest to the corresponding capacitor voltage.

Instead of using a look-up table, an analytic expression may be used instead. The relation of the interim storage capacitor voltage to the current command may be expressed using one or more different analytic expressions, each for a different range of voltage. In some embodiments, a combination of a look-up table and an analytic expression may be used.

The value of the interim storage capacitors should be selected so that there remains a margin of unused energy capacity when rapid gait changes occur, so that all the energy from such gait changes can be comfortably be accommodated without causing the torque to drop off. The margin of excess capacity should not be so great, however, to pose an undue risk to the user. The margin can be implemented by maintaining the voltage of the interim storage capacitor to a value that is below its voltage limit.

While setting $K_f<0.25$ is possible to slow down the current command changes, care should be taken not to reduce $K_f$ too much otherwise transient responses may be worsened.

The most appropriate look-up table will be dependent on the application. In the embodiment described herein, where energy is harvested from one or two human knee joints, a piece-wise linear or polynomial curve has been found to be the most beneficial. This would likely be the same for most predictably similar applications. The improvement from using such complex curves, rather than the relatively simple one of FIG. 2, arises because, by increasing the slope more steeply, we can more tightly control the interim storage capacitor voltage in those areas. This allows for the use of smaller, lower voltage capacitors because the voltage is controlled more tightly.

In other embodiments an adaptive look-up table or curve may be used, which adapts to the historic power generation or terrain, which would be indicative of future power generation. Tuning the look-up table to the terrain would be to keep the capacitor voltage within a predetermined range. The load may include a DC/DC converter, and an adaptive look-up table may be tuned to the converter's efficiency sweet spot by keeping the capacitor voltage within a certain range. The tuning process would involve the power source 12 communicating the change in the look-up table parameters to the control module 36, which would then update the look-up table. Since the look-up table is already resident in the load 30, the update rate of the table parameters is not critical and a once per second update would be considered a fast enough update rate of the look-up table parameters.

Different values of $T_c$ can be used. The shorter the update period $T_c$, the tighter the intermediate storage capacitor operating voltage range. If the $T_c$ period is short enough, for instance ≤250 ms, the filter 56, 58 may be unnecessary. In this case, the next current command is calculated based completely on the capacitor voltage. However, the output current fed into the load will vary rapidly and relatively widely, which may not be appropriate for the applications that require a steadier current supply. If larger variations in the voltage of the interim storage capacitor can be tolerated, then the value of $T_c$ may be increased. While the capacitance of the interim storage capacitors has in some embodiments been given as 30 mF or 40 mF, other values are clearly possible.

Different values of the control scheme parameters have been used in different embodiments, including: $T_c=0.25$ s, $K_f=1.00$; $T_c=0.25$ s, $K_f=0.50$; $T_c=0.50$ s, $K_f=0.25$; $T_c=0.10$ s, $K_f=1.00$; $T_c=0.10$ s, $K_f=0.50$. Other values are possible as would be evident to the person of skill in the art.

Filters for filtering the current command may be of any type, not strictly limited to first-order IIR digital filters. They may be analog or digital, or part of each, they may incorporate higher orders, and feed-forward, multiple feedback paths, robust control (static) or optimal (adaptive) parameters for changing inputs (bio-mechanical) and outputs (electrical load).

The interim electrical storage module may include battery cells or packs of cells, or it may be a combination of battery and capacitor. Capacitors may be conventional or supercapacitor style. Inductors may also be used, although the control method will have to be drastically different. If the interim electrical energy storage module includes one or more inductors, then current limits in the inductors would need to be taken into consideration.

In general, unless otherwise indicated, singular elements may be in the plural and vice versa with no loss of generality.

Throughout the description, specific details have been set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

The detailed description has been presented partly in terms of methods or processes, symbolic representations of operations, functionalities and features of the invention. These method descriptions and representations are the means used by those skilled in the art to most effectively convey the substance of their work to others skilled in the art. A software implemented method or process is here, and generally, understood to be a self-consistent sequence of steps leading to a desired result. These steps require physical manipulations of physical quantities. Often, but not necessarily, these quantities take the form of electrical or magnetic signals or values capable of being stored, transferred, combined, compared, and otherwise manipulated. It will be further appreciated that the line between hardware and software is not always sharp, it being understood by those skilled in the art that the software implemented processes described herein may be embodied in hardware, firmware, software, or any combination thereof. Such processes may be controlled by coded instructions such as microcode and/or by stored programming instructions in one or more tangible or non-transient media readable by a computer or processor. The code modules may be stored in any computer storage system or device, such as hard disk drives, optical drives, solid state memories, etc. The methods may alternatively be embodied partly or wholly in specialized computer hardware, such as ASIC or FPGA circuitry.

While the best presently contemplated mode of carrying out the subject matter is disclosed and claimed herein, it will be clear to one having skill in the art that variations to the specific details disclosed herein can be made, resulting in other embodiments that are within the scope of the invention disclosed. Modules of the system may be divided into constituent modules or they may be duplicated. The division of functions between the various blocks of circuitry may be changed without altering the overall functions of the system. All parameters and configurations described herein are examples only and actual values of such depend on the specific embodiment. Accordingly, the scope of the invention is to be construed in accordance with the substance defined by the following claims.

The invention claimed is:

1. A system for managing power supplied to a load from a bio-mechanical energy harvester, comprising:
    an energy harvester configured to attach to two body segments connected by a joint and to generate electrical energy as a result of relative movement between said segments;
    an interim electrical storage module that has a voltage limit and stores said energy; and
    a control module that:
        reads a voltage of said storage module;
        determines a current to supply from said storage module to the load based on said voltage; and
        controls supply of the determined current to the load from said storage module, thereby maintaining the voltage of said storage module below the voltage limit.

2. The system according to claim 1, wherein the control module maintains said voltage within a predetermined range while current is being supplied to the load.

3. The system according to claim 1 wherein the control module permits supply of current to the load only when said voltage exceeds a threshold voltage.

4. The system according to claim 1, wherein the control module maintains the voltage below the voltage limit by at least a voltage margin.

5. A system for managing power supplied to a load from a bio-mechanical energy harvester, comprising:
    an energy harvester configured to attach to at least two body segments and to generate electrical energy as a result of relative movement between said segments;
    an interim electrical storage capacitor that has a voltage limit and stores said energy; and
    a control module that:
        reads a voltage of said capacitor;
        determines a current to supply to the load based on said voltage; and
        controls supply of the determined current to the load from said capacitor, thereby maintaining the voltage of said capacitor below the voltage limit;
    wherein the energy harvester ceases to apply a torque to the body segments if the voltage of said capacitor exceeds the voltage limit.

6. The system according to claim 5, wherein the control module:
    controls supply of said current for a predetermined duration of time; and
    repeats said reading, determining and controlling steps to maintain the voltage below the voltage limit.

7. A system for managing power supplied to a load from a bio-mechanical energy harvester, comprising:
    an energy harvester configured to attach to at least two body segments and to generate electrical energy as a result of relative movement between said segments;
    an interim electrical storage module that has a voltage limit and stores said energy; and
    a control module that:
        reads a voltage of said storage module;
        determines a current to supply to the load based on said voltage; and
        controls supply of the determined current to the load from said storage module, thereby maintaining the voltage of said storage module below the voltage limit;
    wherein the control module:
        stores a last value of current $I_L$ supplied to the load; and
        determines the current to supply to the load based on said last value.

8. The system according to claim 7, wherein the control module:
    obtains an unfiltered current value $I_V$ based solely on the voltage of said storage module;
    multiplies the unfiltered current value $I_V$ by a factor $K_f$ to obtain $K_f I_V$, where $0 < K_f \leq 1$;
    multiplies said last value of current $I_L$ by a factor $(1-K_f)$ to obtain $(1-K_f)I_L$; and
    adds $K_f I_V$ to $(1-K_f)I_L$ to determine the current to supply to the load.

9. The system of claim 1 wherein the control module accesses a look-up table to determine the current to supply to the load, wherein the look-up table comprises voltage values of said storage module and corresponding current values.

10. The system of claim 9, wherein the current values:
    are zero for voltage values that are below a threshold voltage;
    are constant and non-zero for voltage values above the voltage limit; and
    increase from zero to said constant as the voltage values increase from the threshold voltage to the voltage limit.

11. A system for managing power supplied to a load from a bio-mechanical energy harvester, comprising:
    an energy harvester configured to attach to at least two body segments and to generate electrical energy as a result of relative movement between said segments;
    an interim electrical storage module that has a voltage limit and stores said energy; and
    a control module that:
        reads a voltage of said storage module;
        determines a current to supply to the load based on said voltage;
        accesses a look-up table to determine the current to supply to the load, wherein the look-up table comprises voltage values of said storage module and corresponding current values, wherein the current values:
            are zero for voltage values that are below a threshold voltage;
            are constant and non-zero for voltage values above the voltage limit; and increase from zero to said constant as the voltage values increase from the threshold voltage to the voltage limit, wherein the increase is linear, polynomial or comprises at least two different linear gradients; and controls supply of the determined current to the load from said storage module, thereby maintaining the voltage of said storage module below the voltage limit.

12. The system according to claim 11, wherein the control module is configured to update the current values in the look-up table to adapt to a terrain over which the system is used or a historic energy generation of the energy harvester.

13. The system according to claim 1, wherein the body segments are a thigh and a shin of a user.

14. The system according to claim 13, comprising:
a further energy harvester configured to be attached to another thigh and another shin of the user and to generate further electrical energy as a result of relative movement between the other thigh and other shin; and
a further interim electrical storage module having a further voltage limit and configured to store said further generated energy;
wherein the control module maintains a voltage of said further storage module below the further voltage limit.

15. The system according to claim 1, wherein the energy harvester has an exo-skeleton format.

16. The system according to claim 1 wherein the load is a rechargeable battery.

17. The system of claim 1 wherein said storage module is a capacitor.

18. The system of claim 17, wherein said capacitor has a capacitance of the order of tens of millifarads.

19. The system of claim 1 wherein said storage module is a battery.

20. The system of claim 1, wherein the generated electrical energy is rectified and smoothed by a smoothing capacitor before being stored by said storage module.

21. A method for managing power supplied to a load from a bio-mechanical energy harvester, comprising:
mechanically linking an energy harvester to two body segments connected by a joint so that electrical energy is generated as a result of relative movement between said segments;
storing said generated energy in an interim electrical storage module that has a voltage limit; and
repeatedly:
reading a voltage of said storage module;
determining a current to supply from said storage module to the load based on said voltage; and
controlling supply of the determined current to the load from said storage module for a predetermined duration of time, thereby maintaining the voltage of said storage module below the voltage limit.

22. The method according to claim 21, further comprising:
storing a last value of current $I_L$ supplied to the load;
obtaining an unfiltered current value $I_V$ based solely on the voltage of said storage module;
multiplying the unfiltered current value $I_V$ by a factor $K_f$ to obtain $K_f I_V$, where $0 < K_f \le 1$;
multiplying said last value of current $I_L$ by a factor $(1-K_f)$ to obtain $(1-K_f)I_L$; and
adding $K_f I_V$ to $(1-K_f)I_L$ to determine the current to supply to the load.

23. The method according to claim 21, further comprising accessing a look-up table to determine the current to supply to the load, wherein:
the look-up table comprises voltage values of said storage module and corresponding current values; and
the current values:
are zero for voltage values that are below a threshold voltage;
are constant and non-zero for voltage values above the voltage limit; and
increase from zero to said constant as the voltage values increase from the threshold voltage to the voltage limit.

* * * * *